United States Patent
Amemiya et al.

(10) Patent No.: US 10,865,061 B2
(45) Date of Patent: Dec. 15, 2020

(54) DRIVING FORCE TRANSMISSION MECHANISM AND IMAGE FORMING APPARATUS

(71) Applicant: SHARP KABUSHIKI KAISHA, Sakai (JP)

(72) Inventors: Masaki Amemiya, Sakai (JP); Norio Tomita, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 10 days.

(21) Appl. No.: 16/241,546

(22) Filed: Jan. 7, 2019

(65) Prior Publication Data
US 2019/0210822 A1  Jul. 11, 2019

(30) Foreign Application Priority Data
Jan. 10, 2018 (JP) .................. 2018-001769

(51) Int. Cl.
| | | |
|---|---|---|
| B65H 3/06 | (2006.01) | |
| F16D 13/08 | (2006.01) | |
| H02K 7/108 | (2006.01) | |
| G03G 15/00 | (2006.01) | |
| G03G 21/16 | (2006.01) | |
| B41J 23/02 | (2006.01) | |

(Continued)

(52) U.S. Cl.
CPC ............ *B65H 3/0669* (2013.01); *B41J 23/02* (2013.01); *F16D 7/048* (2013.01); *F16D 13/08* (2013.01); *G03G 15/6511* (2013.01); *G03G 21/1647* (2013.01); *H02K 7/108* (2013.01); *B65H 2403/72* (2013.01); *G03G 15/2053* (2013.01); *G03G 15/6529* (2013.01); *G03G 2221/1657* (2013.01)

(58) Field of Classification Search
CPC ... B41J 23/02; B65H 3/0669; G03G 21/1647; F16D 41/18; F16D 7/048; F16D 41/06
See application file for complete search history.

(56) References Cited

U.S. PATENT DOCUMENTS 3,486,597 A * 12/1969 Carlton ................... F16D 41/12
192/46
8,337,077 B2 * 12/2012 Giacobino .............. F16D 41/18
368/206

(Continued)

FOREIGN PATENT DOCUMENTS

JP  H04-124344 U1  11/1992

*Primary Examiner* — Patrick Cicchino
(74) *Attorney, Agent, or Firm* — ScienBiziP, P.C.

(57) ABSTRACT

A driving force transmission mechanism includes a first transmission member and a second transmission member that are arranged on an identical rotational center axis. The first transmission member includes one or more transmission claws engaged with the second transmission member. The transmission claw includes, at a position away from the rotational center axis, a fixing portion with respect to the first transmission member, and extends in a direction crossing a direction directed from the fixing portion to the rotational center axis. The second transmission member includes one or more stoppers engaged with a tip end of the transmission claw and one or more holding portions engaged with a side of the transmission claw, which faces the rotational center axis.

7 Claims, 9 Drawing Sheets

(51) Int. Cl.
*F16D 7/04* (2006.01)
*G03G 15/20* (2006.01)

(56) References Cited

U.S. PATENT DOCUMENTS

| | | | | |
|---|---|---|---|---|
| 8,550,449 | B2* | 10/2013 | Vicente, Jr. | B41J 11/24 |
| | | | | 192/46 |
| 8,727,335 | B1* | 5/2014 | Vicente, Jr. | F16D 43/16 |
| | | | | 192/105 CD |
| 10,098,768 | B2* | 10/2018 | Cummins | A61F 2/95 |
| 2017/0023073 | A1* | 1/2017 | Rivera | F16H 41/24 |

* cited by examiner

DRIVING FORCE TRANSMISSION MECHANISM AND IMAGE FORMING APPARATUS

BACKGROUND

1. Field

The present disclosure relates to a driving force transmission mechanism that transmits a driving force in one direction and an image forming apparatus that includes the driving force transmission mechanism.

2. Description of the Related Art

An image forming apparatus includes, to continuously perform a process of forming an image on a sheet, a plurality of conveyance rollers that convey the sheet. The conveyance rollers are rotated by a driving source such as a motor while holding a sheet, and thereby convey the sheet in a given direction. Here, when the conveyance of the sheet stops or the sheet is jammed for some reasons, the sheet that is stopped in a conveyance path is removed, but the sheet is held by the conveyance rollers. When the jammed sheet is pulled out, since the conveyance rollers are connected to the motor through a reduction gear or the like, a great force is desired and there is a possibility that the sheet is torn and is difficult to be removed.

Thus, a driving force transmission mechanism that transmits a rotational force of the motor in a conveyance direction of the sheet but does not transmit the rotation force in an opposite direction is installed between the conveyance rollers and the motor in some cases. By providing the driving force transmission mechanism, even when the motor stops, the conveyance rollers are able to be freely rotated only in the conveyance direction of the sheet. As the driving force transmission mechanism described above, a ratchet mechanism that includes a ratchet and a ratchet wheel is proposed (for example, refer to Japanese Unexamined Utility Model Registration Application Publication No. 4-124344).

A ratchet mechanism described in Japanese Unexamined Utility Model Registration Application Publication No. 4-124344 is constituted by a ratchet wheel attached to a driven-side shaft and a ratchet, and the ratchet wheel is formed with a plurality of stop surfaces that extend in a radial direction along a circumferential direction. The ratchet includes a peripheral wall of a substantially cylindrical shape and ratchet portions that face each other with a rotational axis therebetween and that are formed in a part of the peripheral wall. Each of the ratchet portions is formed of resin having elasticity and has a tip end facing a stop surface.

In the ratchet mechanism, when the ratchet rotates in a forward direction, a tip end of the ratchet portion is engaged with the stop surface for pressing, a rotational force is transmitted to the ratchet wheel. When the ratchet rotates in an opposite direction, the ratchet portion is bent and deformed so as to climb over the stop surface and the engagement between the ratchet portion and the stop surface is released, so that the rotational force of the ratchet is not transmitted to the ratchet wheel and only the ratchet runs idle.

The ratchet mechanism described above has a structure in which the engagement between the ratchet portion and the stop surface is performed on one surface of the tip end of the ratchet portion. Thus, when the rotation of the ratchet is transmitted to the ratchet wheel, a reaction force that acts on the tip end of the ratchet portion acts in a direction in which the ratchet portion is bent. As a result, a part of the rotational force of the ratchet is used for bending deformation of the ratchet portion and the rotational force may be difficult to be efficiently transmitted. Additionally, due to the bending deformation of the ratchet portion, a fatigue fracture may be caused in the ratchet portion. Further, in a case where the ratchet mechanism described above is used for a roller with a great rotation torque, an amount of the bending deformation of the ratchet portion increases so that the ratchet portion may be broken.

The disclosure provides a driving force transmission mechanism capable of suppressing bending of a part that transmits a driving force in transmission of a force and efficiently transmitting a rotational force, and an image forming apparatus that includes the driving force transmission mechanism.

SUMMARY

A driving force transmission mechanism according to the disclosure is a driving force transmission mechanism that transmits a driving force in one direction, and includes a first transmission member and a second transmission member that are arranged on an identical rotational center axis, in which the first transmission member includes one or more transmission claws engaged with the second transmission member, the transmission claw includes, at a position away from the rotational center axis, a fixing portion with respect to the first transmission member, and extends in a direction crossing a direction directed from the fixing portion to the rotational center axis, and the second transmission member includes one or more stoppers engaged with a tip end of the transmission claw and one or more holding portions engaged with a side of the transmission claw, which faces the rotational center axis.

An image forming apparatus according to the disclosure includes the driving force transmission mechanism according to the disclosure.

DESCRIPTION OF THE EMBODIMENTS

First Embodiment

An image forming apparatus according to a first embodiment of the disclosure will be described below with reference to drawings.

Figure 1:
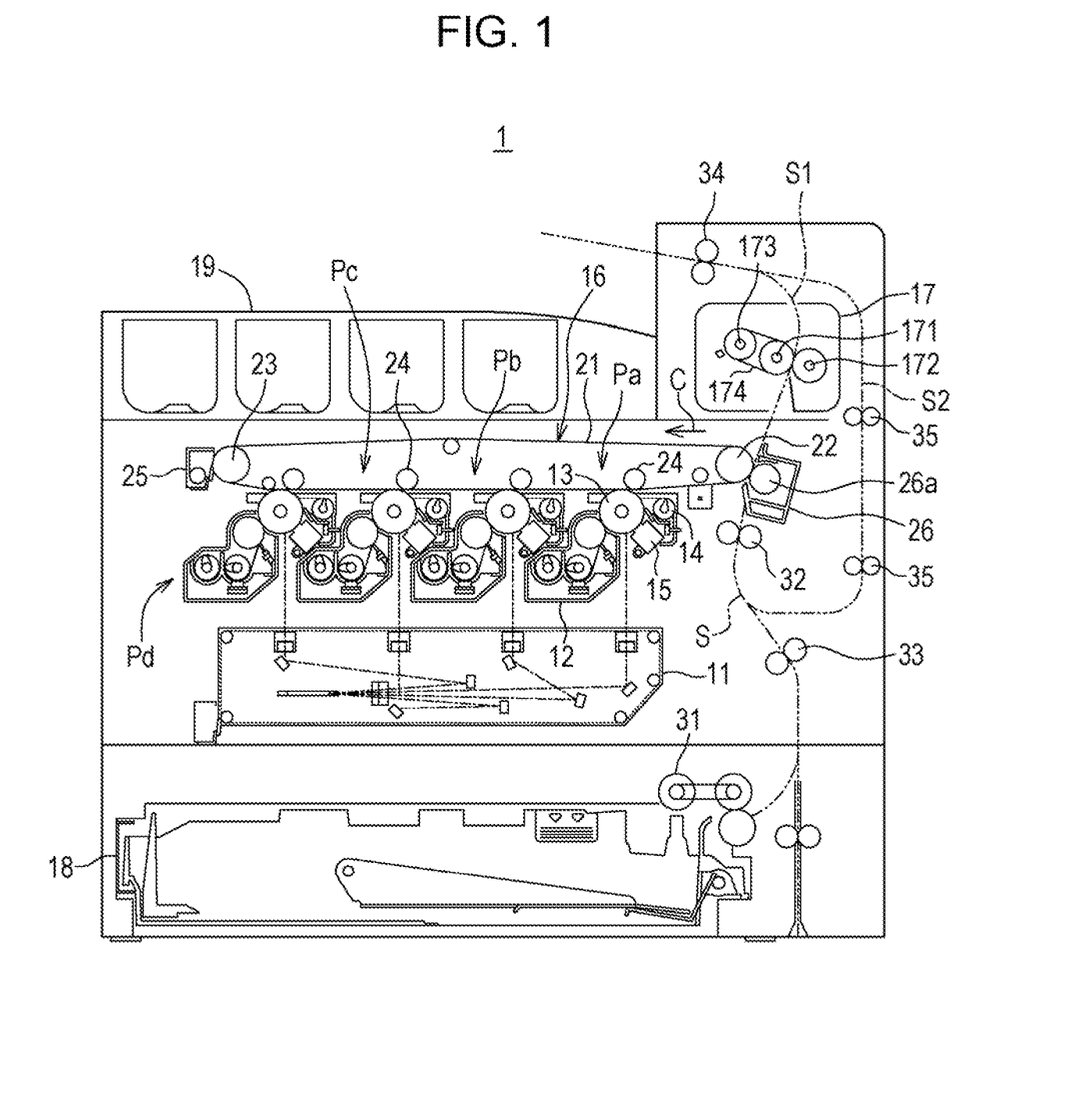
FIG. 1 is a schematic side view of an image forming apparatus according to a first embodiment of the disclosure.

FIG. 1 is a schematic side view of the image forming apparatus according to the first embodiment of the disclosure.

An image forming apparatus 1 according to the first embodiment of the disclosure is configured to include an exposure device 11, a development device 12, a photoreceptor drum 13, a cleaner device 14, a charger 15, an intermediate transfer belt device 16, a fixing device 17, a feeding cassette 18, a discharge tray 19, and a sheet conveyance path S, and forms a multicolored or monochromatic image on a given sheet in accordance with image data transmitted from outside.

Image data handled in the image forming apparatus 1 corresponds to a color image using colors of black (K), cyan (C), magenta (M), and yellow (Y). Thus, in order to form four kinds of latent images according to the respective colors, four development devices 12, four photoreceptor drums 13, four chargers 15, and four cleaner devices 14 are provided so as to be associated with black, cyan, magenta, and yellow. Thus, four image stations Pa, Pb, Pc, and Pd are constituted.

The photoreceptor drum 13 is arranged at an almost center of the image forming apparatus 1. The charger 15 charges a surface of the photoreceptor drum 13 at a predetermined potential uniformly. The exposure device 11 causes the surface of the photoreceptor drum 13 to be exposed to light so as to form an electrostatic latent image. The development device 12 develops the electrostatic latent image on the surface of the photoreceptor drum 13 so as to form a toner image on the surface of the photoreceptor drum 13. By the aforementioned series of operations, each toner image of the corresponding color is formed on the corresponding surface of the photoreceptor drum 13. The cleaner device 14 removes and collects residual toner on the surface of the photoreceptor drum 13 after development and image transfer.

The intermediate transfer belt device 16 is arranged above the photoreceptor drum 13 and includes an intermediate transfer belt 21, an intermediate transfer belt drive roller 22, an intermediate transfer belt driven roller 23, an intermediate transfer roller 24, and an intermediate transfer belt cleaning device 25. Note that, four intermediate transfer rollers 24 are provided correspondingly to the image stations of the respective colors for YMCK.

The intermediate transfer belt drive roller 22, the intermediate transfer belt driven roller 23, and the intermediate transfer rollers 24 are configured to stretch the intermediate transfer belt 21 and move a surface of the intermediate transfer belt 21 in a given direction (a direction indicated by an arrow C).

The intermediate transfer belt 21 moves around in the direction indicated by the arrow C, the residual toner is removed and collected by the intermediate transfer belt cleaning device 25, the toner image of each color formed on the corresponding surface of the photoreceptor drum 13 is sequentially transferred and superimposed, so that a color toner image is formed on the surface of the intermediate transfer belt 21.

The image forming apparatus 1 further includes a secondary transfer device 26 including a transfer roller 26a. A nip area is formed between the transfer roller 26a and the intermediate transfer belt 21 and a sheet conveyed through the sheet conveyance path S is nipped by the nip area to be conveyed. The toner image on the surface of the intermediate transfer belt 21 is transferred to the sheet when the sheet passes through the nip area.

The feeding cassette 18 is a cassette in which a sheet used for image formation is stacked, and is provided below the exposure device 11. The discharge tray 19 is provided on an upper side of the image forming apparatus 1 and is a tray on which a sheet on which image formation has been performed is placed.

The sheet conveyance path S includes a main path S1 provided in an S-shape and a reverse path S2 that branches in a middle of the main path S1 and merges the main path S1 again, and a pickup roller 31, a pre-registration roller 33, a registration roller 32, the secondary transfer device 26, the fixing device 17, and a discharge roller 34 are arranged along the main path S1. The reverse path S2 branches at a portion between the fixing device 17 and the discharge roller 34 and merges again at a portion between the pre-registration roller 33 and the registration roller 32 via a plurality of conveyance rollers 35.

The pickup roller 31 is a draw-in roller that is provided in a vicinity of an end of the feeding cassette 18 and supplies a sheet from the feeding cassette 18 one by one to the sheet conveyance path S. The registration roller 32 temporarily holds the sheet conveyed from the feeding cassette 18 and conveys the sheet to the transfer roller 26a at timing of aligning a leading end of the toner image on the photoreceptor drum 13 and a leading end of the sheet. The pre-registration roller 33 is a small roller that promotes and supports the conveyance of the sheet.

The fixing device 17 is a device of a belt fixing type and a fixing belt 174 is wound on a fixing roller 171 and a heating roller 173. In the fixing device 17, a pressure roller 172 is pressed against the fixing roller 171 via the fixing belt 174. In the fixing device 17, the sheet on which an unfixed toner image is formed is received, and the sheet is conveyed by being sandwiched between the fixing belt 174 and the pressure roller 172. The sheet after the fixation is discharged onto the discharge tray 19 by the discharge roller 34.

In a case where image formation is performed not only on a front surface of the sheet but also on a rear surface thereof, the sheet is conveyed in a reverse direction from the discharge roller 34 to the reverse path S2 where the sheet is turned over and guided again to the registration roller 32. Then, image formation is performed on the rear surface similarly to the front surface and the sheet is carried to the discharge tray 19.

Next, a portion where a driving force transmission mechanism according to the first embodiment of the disclosure is applied will be described with reference to drawings.

Figure 2:
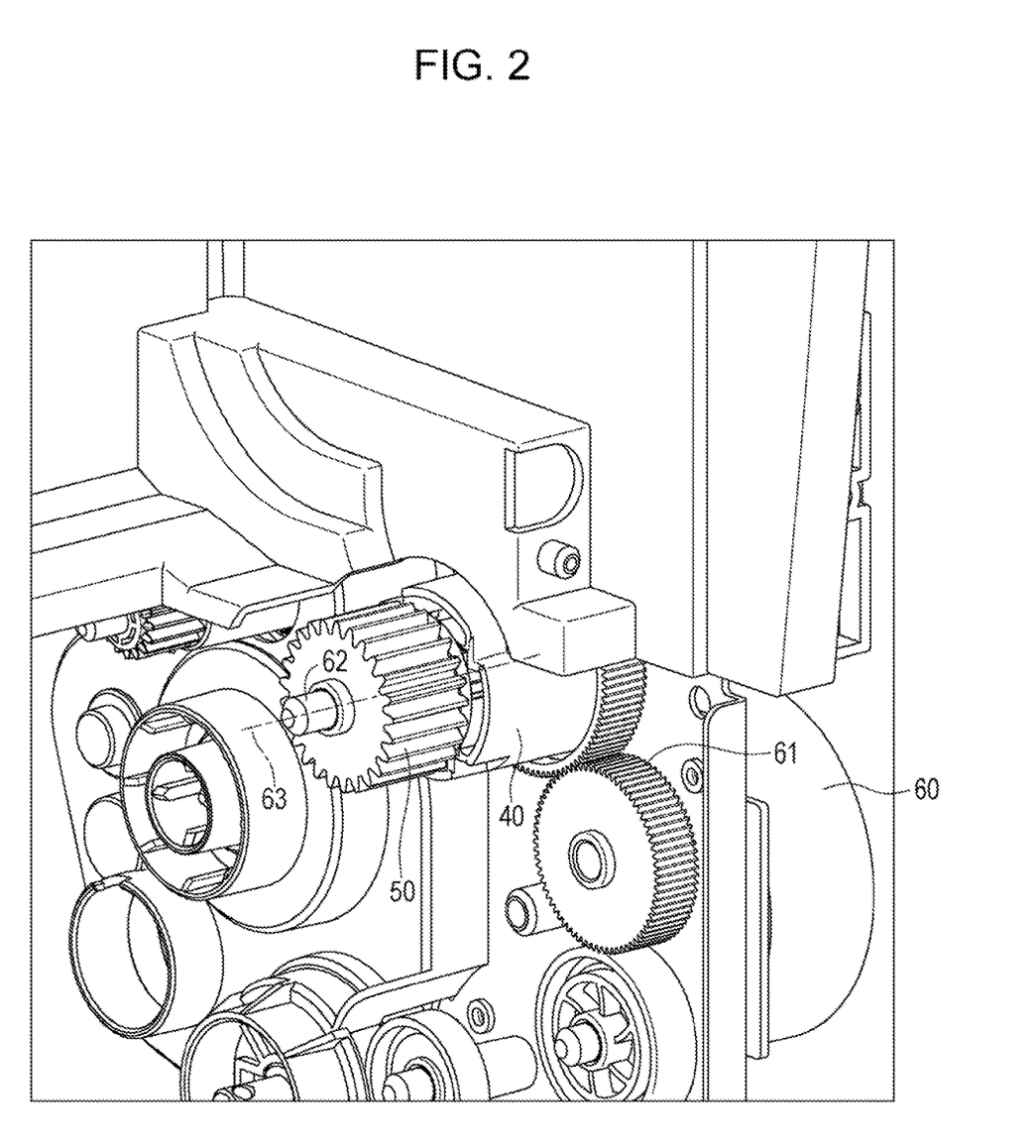
FIG. 2 is a schematic perspective view illustrating a vicinity of a motor.

FIG. 2 is a schematic perspective view illustrating a vicinity of a motor.

FIG. 2 illustrates a state where a driving force transmission portion that transmits a rotational force of a motor 60 to the fixing roller 171 is viewed obliquely.

In the image forming apparatus 1 described above, the motor 60 transmits the rotational force to the fixing roller 171 via a driving gear 61, a first transmission member 40, and a second transmission member 50, which are provided between the motor 60 and the fixing roller 171, in order. The first transmission member 40 and the second transmission member 50 are arranged to be adjacent on a support shaft 62. Note that, a member (not illustrated) such as a gear fixed to a shaft of the motor 60 or a gear fixed to a shaft of the fixing roller 171 may be provided between the motor 60 and the fixing roller 171, in addition to the members described above.

The driving force transmission mechanism according to the first embodiment of the disclosure is provided in an engagement portion between the first transmission member 40 and the second transmission member 50.

First, a structure of the first transmission member will be described with reference to FIGS. 3A and 3B.

Figure 3A:
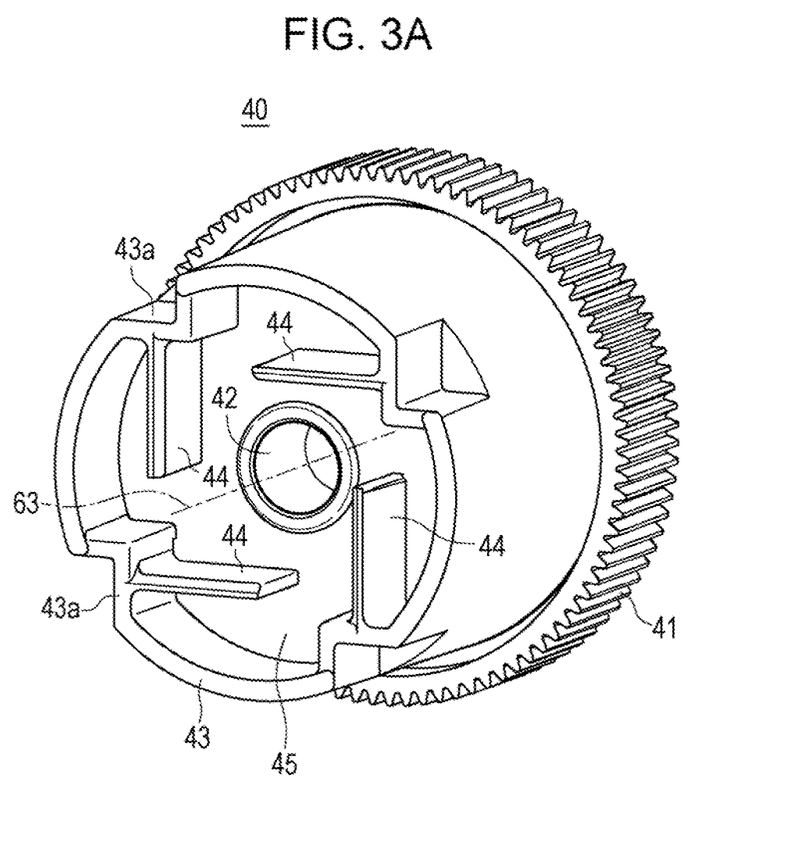
FIG. 3A is a schematic perspective view illustrating a first transmission member.
Figure 3B:
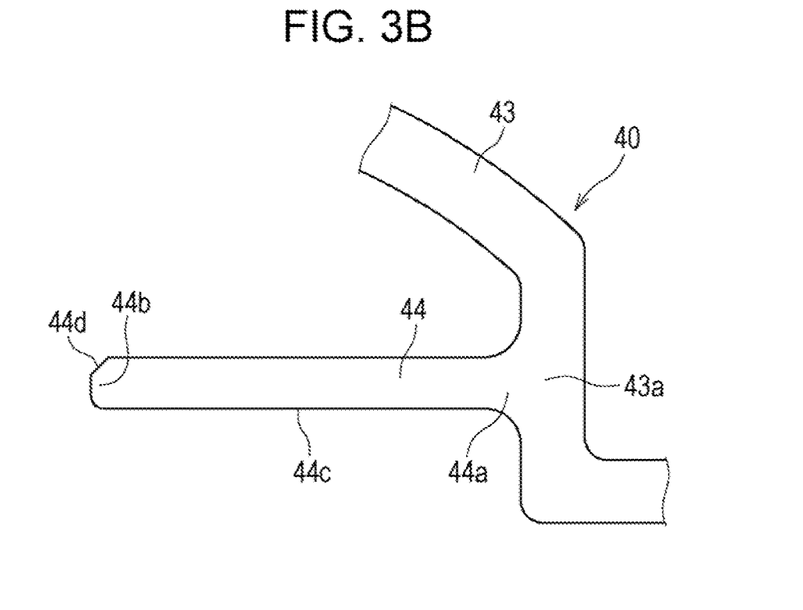
FIG. 3B is an enlarged explanatory view illustrating a vicinity of a transmission claw of FIG. 3A on an enlarged scale.

FIG. 3A is a schematic perspective view illustrating the first transmission member and FIG. 3B is an enlarged explanatory view illustrating a vicinity of a transmission claw of FIG. 3A on an enlarged scale.

The first transmission member 40 is a gear of a substantially columnar shape, and a first support hole 42 through which the support shaft 62 is inserted is provided at a center thereof and first connection gear teeth 41 that are engaged with the driving gear 61 are provided at an outer peripheral part thereof. In a facing surface 45 that faces the second transmission member 50 out of an end surface part of the first transmission member 40, a cylindrical wall portion 43 that is substantially cylindrical is provided at an outer edge and the cylindrical wall portion 43 has a space inside thereof. A transmission claw 44 extends from an inner wall surface of the cylindrical wall portion 43.

Specifically, the transmission claw 44 has a fixing portion 44a that is positioned at an end and provided in the cylindrical wall portion 43, and extends to the inside of the cylindrical wall portion 43 toward a position away from a rotational center (rotational center axis 63) of the support shaft 62 in a radial direction. That is, the transmission claw 44 extends from the fixing portion 44a so as to be closer to the rotational center axis 63 in a direction crossing the radial direction. A wall portion 43a, which is connected to the fixing portion 44a, in the inner wall surface of the cylindrical wall portion 43 is formed in a direction perpendicular to a direction in which the transmission claw 44 extends. The transmission claw 44 has the fixing portion 44a connected to the wall portion 43a and has a tip end (contact end 44b) side not fixed by the facing surface 45. Thus, the transmission claw 44 has a structure in which the contact end 44b side moves in a range of elasticity that the transmission claw 44 has.

The contact end 44b of the transmission claw 44 is engaged with a stopper 53a of the second transmission member 50 described below. Moreover, a support surface 44c that contacts a holding portion 53b (refer to FIGS. 4A and 4B described below) of the second transmission member 50 is provided on the rotational center axis 63 side of an extended part (between the fixing portion 44a and the tip end 44b) of the transmission claw 44.

The support surface 44c is formed planarly and the contact end 44b is provided with a claw inclined portion 44d obtained by cutting a corner opposite to the support surface 44c. The claw inclined portion 44d is inclined so that a thickness of the transmission claw 44 decreases toward the contact end 44b from the fixing portion 44a.

In the present embodiment, the transmission claw 44 is arranged so as to be parallel to another transmission claw 44 with the support shaft 62 held therebetween. Further, in a case of a configuration in which a plurality of pairs of transmission claws 44 are provided, the plurality of transmission claws 44 may be arranged with an equal interval along a circumferential direction of the support shaft 62. In a case where the transmission claws 44 are not arranged so as to be paired, such as a case where the number of transmission claws 44 is odd, the plurality of transmission claws 44 may be arranged with an equal interval along the circumferential direction of the support shaft 62.

The first transmission member is formed of a resin material for engineering, for example, such as polycarbonate or polyacetal (POM).

Next, a structure of the second transmission member 50 will be described with reference to FIGS. 4A and 4B.

Figure 4A:
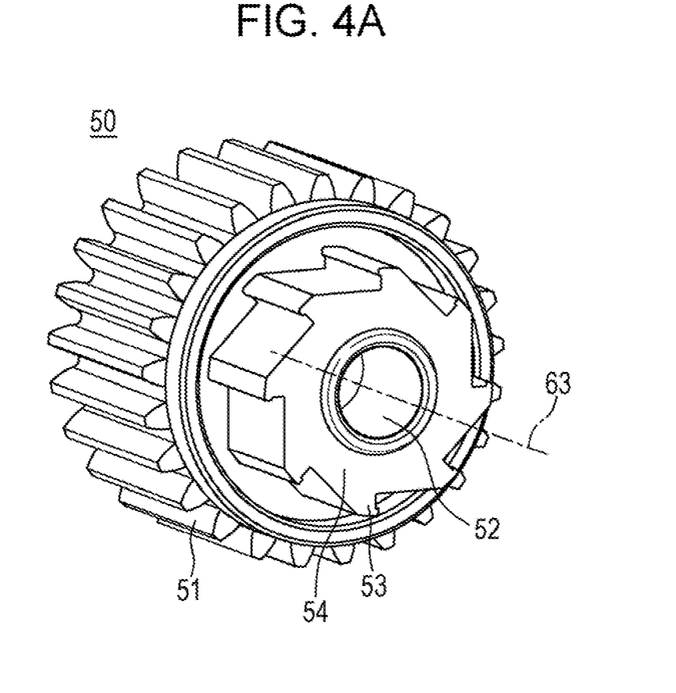
FIG. 4A is a schematic perspective view illustrating a second transmission member.
Figure 4B:
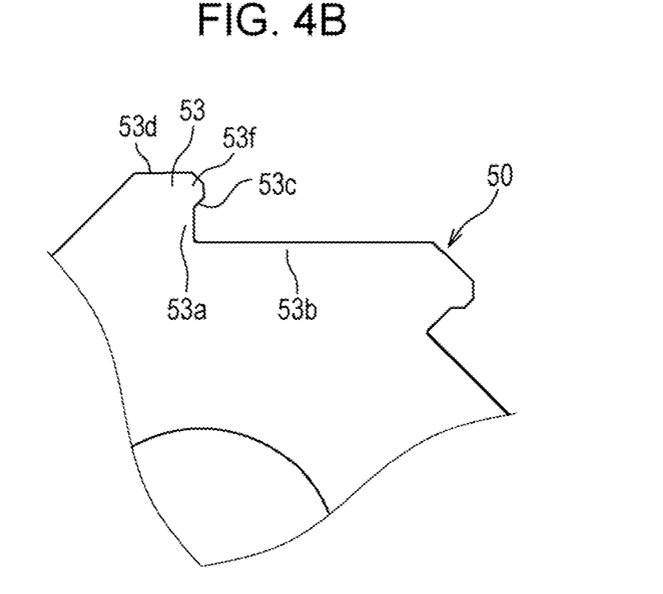
FIG. 4B is an enlarged explanatory view illustrating a vicinity of a transmission tooth of FIG. 4A on an enlarged scale.

FIG. 4A is a schematic perspective view illustrating the second transmission member and FIG. 4B is an enlarged explanatory view illustrating a vicinity of a transmission tooth of FIG. 4A on an enlarged scale.

The second transmission member 50 is a gear of a substantially columnar shape, and a second support hole 52 through which the support shaft 62 is inserted is provided at a center thereof and second connection gear teeth 51 which are engaged with a gear or the like connected to the fixing roller 171 are provided at an outer peripheral part thereof. In an end surface part that faces the first transmission member 40 out of an end surface part of the second transmission member 50, transmission teeth 53 that contact the transmission claw 44 are provided.

The transmission teeth 53 are formed so as to be projected to the first transmission member 40 side with the second support hole 52 as a center and include a plurality of holding portions 53b that are arranged in parallel with the rotational center axis 63 therebetween. In the present embodiment, two holding portions 53b that are arranged in parallel are arranged so that an equal arrangement interval in a circumferential direction is achieved with the rotational center axis 63 as a center. In a configuration illustrated in FIG. 4A, eight holding portions 53b are provided and arranged with an angular interval of 45 degrees. Note that, in a case where the arrangement interval of the holding portions 53b is equal, the holding portions 53b may not be arranged so as to be in parallel with the rotational center axis 63 therebetween. Each of the holding portions 53b is formed planarly.

At an end of the holding portion 53b, the stopper 53a that extends outwardly in the radial direction of the rotational center axis 63 from the holding portion 53b is provided. The stopper 53a is formed planarly and extends in a direction vertical to the holding portion 53b in a configuration illustrated in FIG. 4B.

At an end of the stopper 53a, which is opposite to the holding portion 53b, a locking projection 53f that is formed so as to be projected from a periphery is provided. At a projected tip end of the locking projection 53f, a corner on the stopper 53a side (lower side in FIG. 4B) serves as a tooth inclined portion 53c that is cut so as to have an inclined surface. Further, at the projected tip end of the locking projection 53f, a corner opposite to the tooth inclined portion 53c (upper side in FIG. 4B) is also cut so as to have an inclined portion similarly and is connected to an outer peripheral inclined surface portion 53d that is a surface parallel to the holding portion 53b.

An end of the outer peripheral inclined surface portion 53d, which is opposite to the locking projection 53f, is connected to an adjacent holding portion 53b with a given angle. Note that, the outer peripheral inclined surface portion 53d may be inclined so as to reduce an outer diameter of the transmission tooth 53 and the angle between the adjacent holding portion 53b and the outer peripheral inclined surface portion 53d may be appropriately set.

As described above, the transmission tooth 53 has the holding portion 53b, the stopper 53a, the locking projection 53f, and the outer peripheral inclined surface portion 53d connected in this order and forms a tooth surface (transmission gear 54) continuously with the adjacent holding portion 53b.

In the present embodiment, the transmission teeth 53 in which a plurality of sets of the holding portion 53b, the stopper 53a, the locking projection 53f, and the outer peripheral inclined surface portion 53d are continuously provided are indicated, but there is no limitation thereto and the transmission teeth 53 may have a structure in which a set of the holding portion 53b and the stopper 53a is provided at only one place. Moreover, the transmission teeth 53 may not have a structure in which a plurality of sets of the holding portion 53b and the stopper 53a are connected and may have a structure in which the sets are discontinuously provided. In such a case, for example, a projection that is projected toward the first transmission member 40 side and has a shape according to the holding portion 53b and the stopper 53a may be provided in the end surface part of the second transmission member 50.

The second transmission member 50 of the present embodiment is formed of the resin material for engineering that contains glass fiber, but may be formed of a material having a high heat-resisting property.

Next, a mechanism that performs transmission of a driving force between the first transmission member 40 and the second transmission member 50 will be described with reference to FIGS. 5 and 6.

Figure 5:
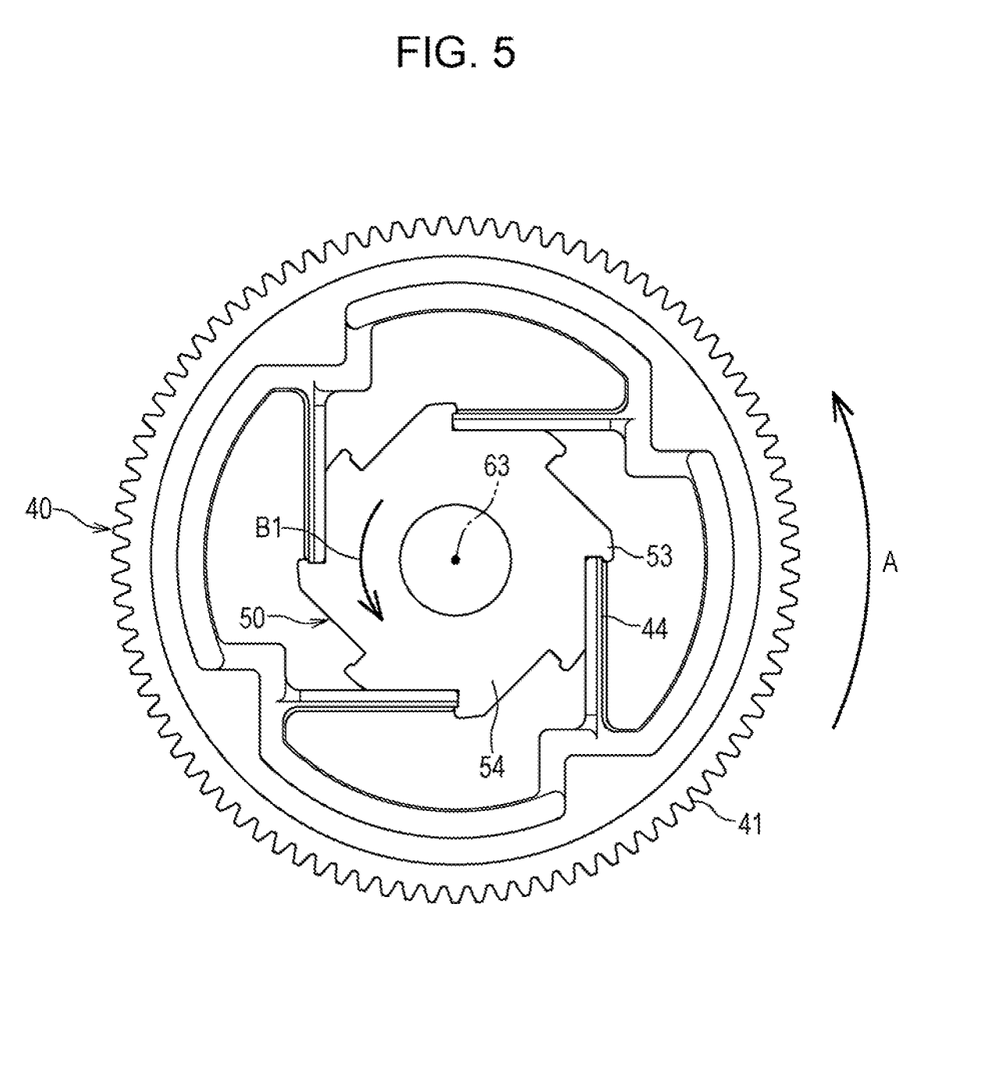
FIG. 5 is a schematic plan view illustrating a state where the first transmission member and the second transmission member are combined.
Figure 6:
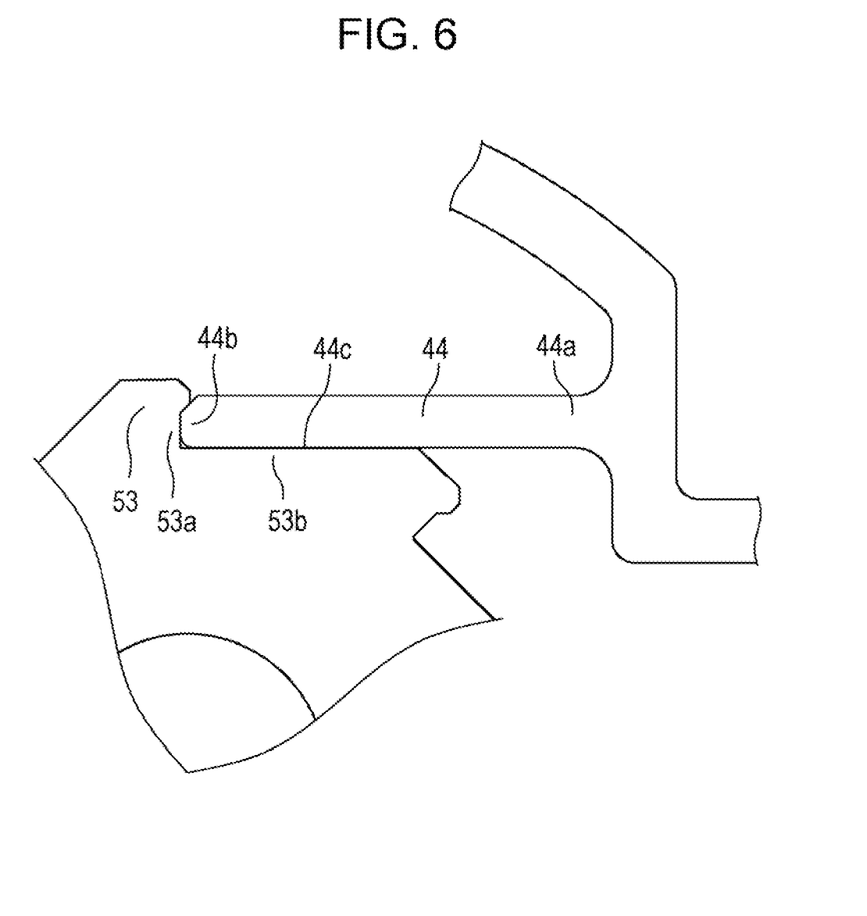
FIG. 6 is an enlarged explanatory view illustrating a vicinity of a transmission claw and a transmission tooth of FIG. 5 on an enlarged scale.

FIG. 5 is a schematic plan view illustrating a state where the first transmission member and the second transmission member are combined and FIG. 6 is an enlarged explanatory view illustrating a vicinity of the transmission claw and the transmission tooth of FIG. 5 on an enlarged scale. Note that, in FIG. 5, in consideration of visibility of the figure, only the transmission teeth 53 in the second transmission member 50 are illustrated and the second connection gear teeth 51 are omitted.

FIG. 5 illustrates a state where the transmission tooth 53 inserted in the cylindrical wall portion 43 is engaged with the transmission claw 44. Specifically, as illustrated in FIG. 6, the contact end 44b contacts the stopper 53a and the support surface 44c contacts the holding portion 53b.

When the motor 60 rotates in such a state, the rotational force of the motor 60 is transmitted to the first connection gear teeth 41 and the first transmission member 40 rotates in a direction indicated by an arrow A in FIG. 5. Here, a rotational force of the first transmission member 40 acts so as to press the stopper 53a that is engaged with the contact end 44b. Since the stopper 53a is arranged at a position away from the rotational center axis 63, the force received by the stopper 53a generates a rotational force around the rotational center axis 63 and the second transmission member 50 rotates in a direction indicated by an arrow B1.

Here, a phenomenon that occurs in a conventional transmission mechanism that does not include the holding portion 53b and a problem thereof will be briefly described. When the motor 60 rotates in the state of FIGS. 5 and 6, the contact end 44b of the transmission claw 44 receives a reaction force from the stopper 53a. The reaction force acts so as to push back the extended part of the transmission claw 44, but the fixing portion 44a is fixed to the cylindrical wall portion 43, so that the reaction force acts in a direction in which the transmission claw 44 is caused to buckle. Additionally, the reaction force acting in the direction in which the transmission claw 44 is caused to buckle acts on the transmission claw 44 while rotating and thus acts in a direction in which the transmission claw 44 is bent to cause bending deformation of the transmission claw 44. Since a part of a rotational driving force by the motor 60 is used for the bending deformation of the transmission claw 44, the rotational force is not smoothly transmitted to the second transmission member 50. Then, there is a possibility that rotational unevenness of the second transmission member 50 is caused, a driving torque increases due to the deformation of the transmission claw 44, or a fatigue fracture of the transmission claw 44 is caused.

In the present embodiment, the transmission claw 44 is in contact with the transmission tooth 53 not only at the contact end 44b but also at the support surface 44c that is in the extended part of a side surface. Thus, the transmission claw 44 is supported by the holding portion 53b so as not to be bent even when receiving the reaction force from the stopper 53a, so that there is no transmission loss and the driving force of the motor 60 is able to be efficiently transmitted. As a result, a greater rotation torque is able to be transmitted to the second transmission member 50. In other words, the driving force is able to be reliably transmitted also to a rotation body with a great load.

Further, since the holding portions 53b and the transmission claws 44 are arranged so that the holding portions 53b face each other and the transmission claws 44 face each other in parallel with the rotational center axis 63 therebetween, the transmission claws 44 push the transmission teeth 53 so as to be held therebetween with an elastic force and backlash is not caused, so that the driving force is able to be stably transmitted.

In the present embodiment, since the locking projection 53f is further provided, the transmission claw 44 does not rise up from the holding portion 53b and is reliably locked by the transmission tooth 53. Moreover, when the claw inclined portion 44d contacts the tooth inclined portion 53c, the contact end 44b is guided to the stopper 53a side, so that the contact end 44b and the stopper 53a are able to be reliably engaged with each other. This makes is possible to more reliably transmit the driving force.

In this manner, by providing the inclined portions that are formed so as to correspond to each other, the transmission claw 44 is more reliably pressed so that an adhesive property at the support surface 44c is enhanced. Additionally, by providing the inclined portions, a gap where the contact end 44 is engaged has a shape that becomes narrower toward a deep inside, and in a case of idling in an opposite direction (for example, in a case where the second transmission member 50 rotates in a direction opposite to the arrow B1), the contact end 44b is easily disengaged and the engagement is able to be easily released.

Next, a case where the second transmission member 50 runs idle will be described with reference to FIG. 7.

Figure 7:
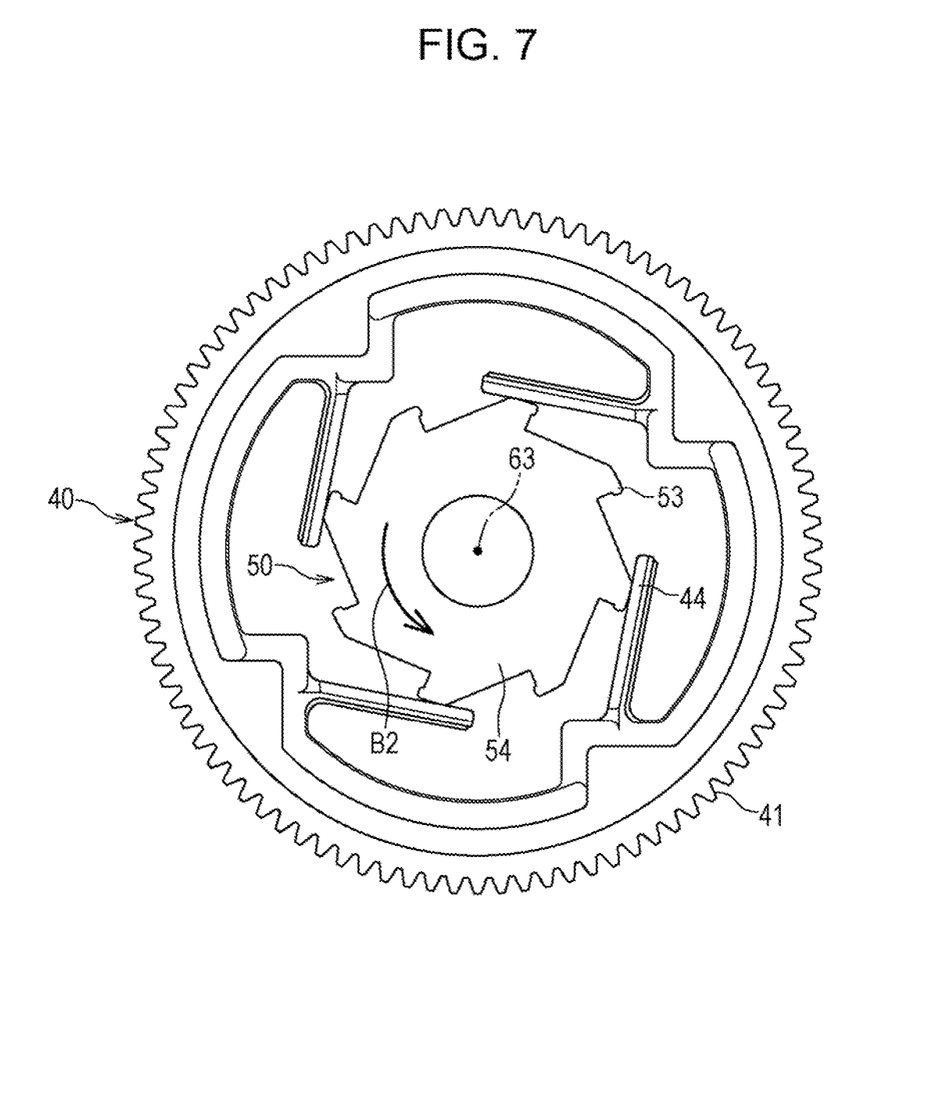
FIG. 7 is a schematic plan view illustrating a state where the second transmission member runs idle.

FIG. 7 is a schematic plan view illustrating a state where the second transmission member runs idle.

In a case where the fixing roller 171 is forcibly rotated in the sheet conveyance direction, for example, in a case where a jammed sheet is tried to be pulled out from the fixing device 17, the second transmission member 50 receives a rotational force in the sheet conveyance direction from a driving gear (not illustrated) of the fixing roller 171. FIG. 7 illustrates the aforementioned case.

In the state illustrated in FIG. 7, while the second transmission member 50 and the transmission tooth 53 rotate in a direction indicated by an arrow B2, the first transmission member 40 remains stopped because the motor 60 stops.

Upon the rotation of the transmission tooth 53, the transmission claw 44 is pressed against the holding portion 53b and the outer peripheral inclined surface portion 53d and is pushed and opened so as to be bent outwardly from the center of the rotational center axis 63. Since the transmission claw 44 is bent and away from the stopper 53a and the holding portion 53b, even when the fixing roller 171 is rotated in the sheet conveyance direction, a driving force of the rotation is not transmitted to the first transmission member 40 and only the second transmission member runs idle.

Note that, when the transmission claw 44 that is pushed and opened passes through the outer peripheral inclined surface portion 53d as the rotation advances, the transmission claw 44 is returned to an original shape with an elastic force so as to be engaged with the holding portion 53b again.

In this manner, during idling, the transmission claw 44 causes bending deformation, but is not broken because the deformation is instantaneous and the direction in which the force acts is not the buckling direction in which the force acts from the contact end 44b to the fixing portion 44a. Moreover, though a deforming stress acts also on the fixing portion 44a due to the bending deformation, the wall portion 43a that includes the fixing portion 44a is formed in a direction vertical to the extending direction of the transmission claw 44, so that it is possible to further relax the stress and avoid breakage of the fixing portion 44a. Additionally, since the outer peripheral inclined surface portion 53d is configured to reduce an outer diameter of the transmission tooth 53, a bending amount of the transmission claw 44 during idling is reduced, thus making it possible to further relax the stress. Due to the reduction in the bending amount of the transmission claw 44 during idling, rap sound (which will be specifically described in a second embodiment) generated when the transmission claw 44 contacts the holding portion 53b again is able to be reduced.

When the transmission claw 44 and the transmission tooth 53 have a shape of the present embodiment as described above, a greater driving force is able to be reliably transmitted only in one direction even with a simple configuration.

Though the motor 60 that is the driving source is connected to the first transmission member 40 side in the present embodiment, there is no limitation thereto, and the driving source may be connected to the second transmission member 50 side. Moreover, though the present embodiment provides a configuration in which the number of transmission claws 44 and the number of transmission teeth 53 are different, there is no limitation thereto and the numbers may be set as appropriate, for example, by making the numbers the same.

Second Embodiment

Next, an image forming apparatus according to the second embodiment of the disclosure will be described with reference to drawings. Since a structure of the image forming apparatus according to the second embodiment is substantially similar to that of the first embodiment, description and a drawing thereof will be omitted.

Figure 8A:
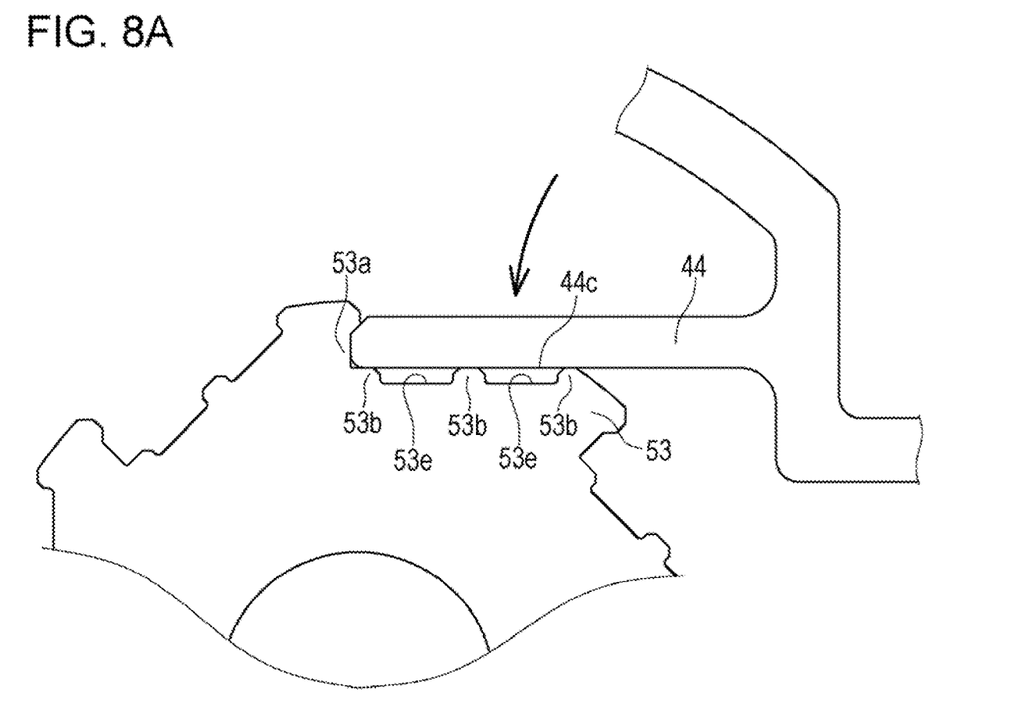
FIG. 8A is an enlarged explanatory view illustrating a vicinity of a transmission claw and a transmission tooth in a second embodiment of the disclosure on an enlarged scale.
Figure 8B:
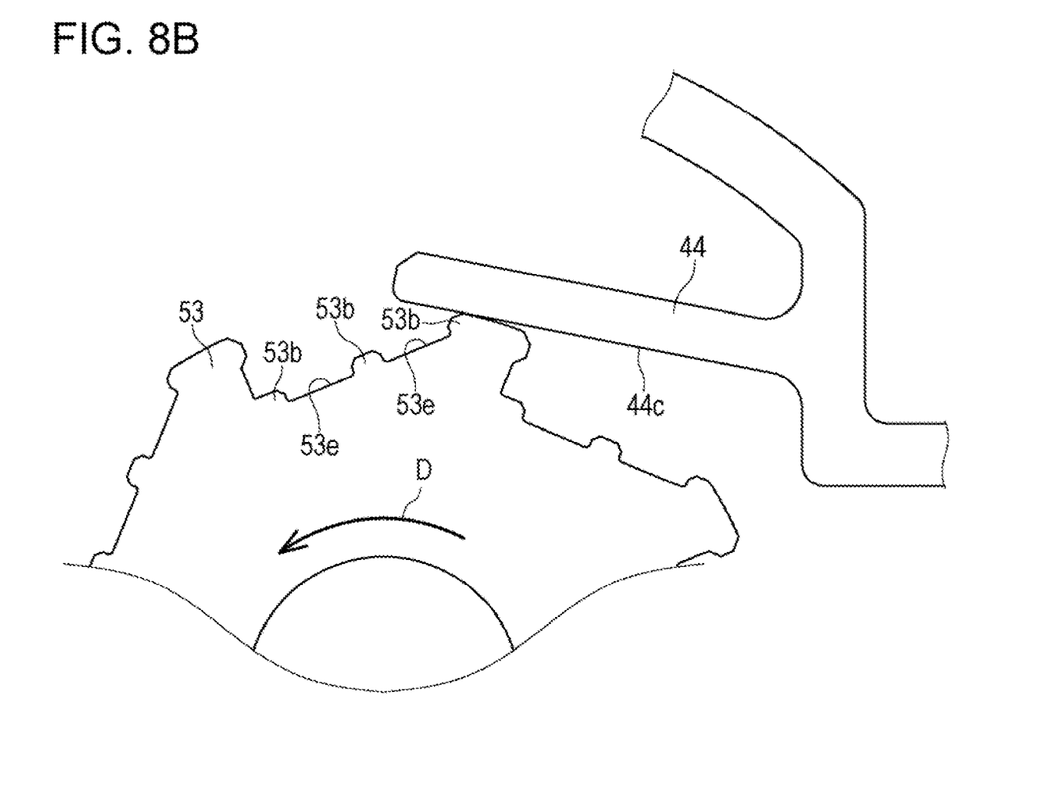
FIG. 8B is an enlarged explanatory view illustrating a state where the transmission claw is pushed and opened by the transmission tooth.

FIG. 8A is an enlarged explanatory view illustrating a vicinity of a transmission claw and a transmission tooth in the second embodiment of the disclosure on an enlarged scale and FIG. 8B is an enlarged explanatory view illustrating a state where the transmission claw is pushed and opened by the transmission tooth.

The second embodiment is different from the first embodiment in a shape of the transmission tooth 53. Specifically, the transmission tooth 53 includes a holding groove 53e in the holding portion 53b. The holding groove 53e has a shape that is recessed to the rotational center axis 63 side from the support surface 44c, and two holding grooves 53e are provided in one holding portion 53b in an example illustrated in FIG. 8A. That is, the holding portion 53b has a structure to be in contact with the support surface 44c at three places of a vicinity of a lower part of the stopper 53a, a vicinity of the outer peripheral inclined surface portion 53d, and a middle part therebetween.

In the driving force transmission mechanism, when the transmission tooth 53 rotates in an idling direction indicated by an arrow D, the transmission claw 44 is bent by being pushed and opened by the holding portion 53b (refer to FIG. 8B). With further rotation, the bending deformation is increased, and when the contact end 44b passes through an upper part of the stopper 53a, the holding portion 53b by which the transmission claw 44 is supported and bent is temporality separated. Then, the transmission claw 44 is in contact with the holding portion 53b to be held by elasticity of the transmission claw 44 (refer to FIG. 8A).

In this manner, large rap sound (sound of collision) may occur when the transmission claw 44 is swept by the holding portion 53b that rotates and is held by (collides with) the holding portion 53b again. On the other hand, since the holding grooves 53e are provided in the holding portion 53b in the present embodiment, an area where the transmission claw 44 is in contact with the holding portion 53b (an area of a surface where the transmission claw 44 collides with the holding portion 53b) is reduced, so that the rap sound is reduced to achieve noise reduction.

Further, in a case where grease is applied to an outer periphery of the transmission tooth 53, the grease is held by the holding groove 53e, thus making it possible to improve a rotation property and a silent property. It is also possible to keep a smooth rotation property and a silent property for a long time.

Note that, instead of the grease, an elastic member that is able to be elastically deformed may be installed in the holding groove 53e. For example, a porous material such as sponge is usable as the elastic member and a noise reduction effect against the rap sound is able to be further enhanced. Additionally, a configuration in which the elastic member is projected from a surface of the holding portion 53b by about 1 mm, and when contacting the support surface 44c, is pressed by the support surface 44c to be pushed into the holding groove 53e may be provided.

Third Embodiment

Next, an image forming apparatus according to a third embodiment of the disclosure will be described with reference to a drawing. Since a structure of the image forming apparatus according to the third embodiment is substantially similar to those of the first embodiment and the second embodiment, description and drawings thereof will be omitted.

Figure 9:
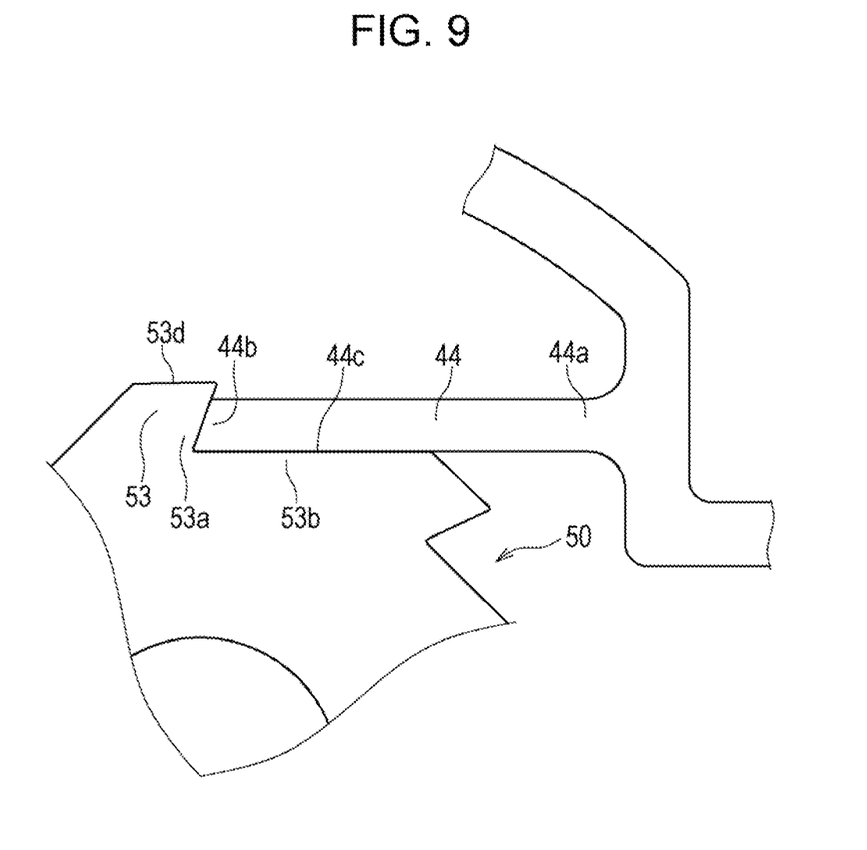
FIG. 9 is an enlarged explanatory view illustrating a vicinity of a transmission claw and a transmission tooth in a third embodiment of the disclosure on an enlarged scale.

FIG. 9 is an enlarged explanatory view illustrating a vicinity of a transmission claw and a transmission tooth in the third embodiment of the disclosure on an enlarged scale.

The third embodiment is different from the first embodiment in shapes of the transmission tooth 53 and the transmission claw 44. Specifically, in the transmission tooth 53, the locking projection 53*f* is not provided in the stopper 53*a*. Moreover, the stopper 53*a* is inclined so that a lower part is projected toward the contact end 44*b* side relative to an upper part. In the transmission claw 44, the claw inclined portion 44*d* is not provided and the contact end 44*b* itself is inclined so as to be engaged with the stopper 53*a*. That is, the contact end 44*b* has an inclination obtained by cutting a corner of the contact end 44*b*, which faces an upper part of the stopper 53*a*. In this manner, by forming the inclination in the contact end 44*b* and the stopper 53*a*, the support surface 44*c* is guided so as to be in contact with the holding portion 53*b*. According to such a configuration, in the transmission claw 44, the contact end 44*b* itself functions similarly to the claw inclined portion 44*d*, and in the transmission tooth 53, the stopper 53*e* itself functions similarly to the locking projection 53*f* and the tooth inclined portion 53*c*.

In the image forming apparatus 1 described above, the driving force transmission mechanism is applied to a transmission mechanism that transmits a driving force to the fixing roller 171, but there is no limitation thereto and the driving force transmission mechanism may be applied to a transmission mechanism that transmits a driving force to another portion. Additionally, though the driving force transmission mechanism having a structure in which the first transmission member 40 and the second transmission member 50 are gears is indicated, there is no limitation thereto and the first transmission member 40 and the second transmission member 50 themselves may be shafts that rotate.

Note that, the embodiments disclosed herein are an example in all respects and shall not serve as a basis for limited interpretation. Accordingly, the technical scope of the disclosure shall not be interpreted only by the aforementioned embodiments, but is defined on the basis of the scope of the claims. Moreover, meanings equivalent to the claims and all modification falling in the scope of the claims are included.

The present disclosure contains subject matter related to that disclosed in Japanese Priority Patent Application JP 2018-001769 filed in the Japan Patent Office on Jan. 10, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A driving force transmission mechanism that transmits a driving force in one direction, the driving force transmission mechanism comprising a first transmission member and a second transmission member that are arranged on an identical rotational center axis, wherein the first transmission member includes a transmission claw engaged with the second transmission member, the transmission claw includes, at a position away from the rotational center axis, a fixing portion of the first transmission member, and extends in a direction crossing a direction directed from the fixing portion to the rotational center axis, and the second transmission member includes a stopper engaged with a tip end of the transmission claw and one or more holding portions engaged with a side of the transmission claw, which faces the rotational center axis, wherein the holding portion includes a holding groove that is recessed from a position where the holding portion is engaged with the transmission claw to a side of the rotational center axis.

2. The driving force transmission mechanism according to claim 1, wherein the side of the transmission claw, which faces the rotational center axis, is formed planarly, and the holding portion is formed planarly.

3. The driving force transmission mechanism according to claim 1, wherein a locking projection that locks a side of the tip end of the transmission claw, which is opposite to the rotational center axis, is provided at an end of the stopper.

4. The driving force transmission mechanism according to claim 3, wherein the transmission claw includes a claw inclined portion that is provided on a side facing the locking projection and is inclined so that a thickness decreases toward an end, and the locking projection includes an inclined portion that is inclined so as to be engaged with the claw inclined portion.

5. The driving force transmission mechanism according to claim 1, wherein the holding groove holds lubricant.

6. The driving force transmission mechanism according to claim 1, wherein the first transmission member includes a plurality of transmission claws that are arranged in parallel with the rotational center axis therebetween, and the second transmission member includes a plurality of holding portions that are arranged in parallel with the rotational center axis therebetween and a plurality of stoppers that are arranged in parallel with the rotational center axis therebetween.

7. An image forming apparatus comprising the driving force transmission mechanism according to claim 1.

* * * * *